US010187712B2

(12) United States Patent
Latvis, Jr.

(10) Patent No.: US 10,187,712 B2
(45) Date of Patent: Jan. 22, 2019

(54) ENERGY DISSIPATION DEVICES

(71) Applicant: Michael P. Latvis, Jr., Buffalo, NY (US)

(72) Inventor: Michael P. Latvis, Jr., Buffalo, NY (US)

( * ) Notice: Subject to any disclaimer, the term of this patent is extended or adjusted under 35 U.S.C. 154(b) by 263 days.

(21) Appl. No.: 15/153,572

(22) Filed: May 12, 2016

(65) Prior Publication Data

US 2017/0064422 A1 Mar. 2, 2017

Related U.S. Application Data

(60) Provisional application No. 62/160,921, filed on May 13, 2015, provisional application No. 62/199,589, filed on Jul. 31, 2015, provisional application No. 62/273,520, filed on Dec. 31, 2015.

(51) Int. Cl.
| | |
|---|---|
| *H04R 1/02* | (2006.01) |
| *F16F 15/02* | (2006.01) |
| *F16F 15/04* | (2006.01) |
| *G10K 11/00* | (2006.01) |
| *F16F 7/00* | (2006.01) |
| *F16F 15/00* | (2006.01) |

(52) U.S. Cl.
CPC ............... *H04R 1/026* (2013.01); *F16F 7/00* (2013.01); *G10K 11/002* (2013.01)

(58) Field of Classification Search
CPC ... H04R 1/026; F16F 7/00; F16F 15/04; F16F 15/08; F16F 15/021; G10K 11/002
See application file for complete search history.

(56) References Cited

U.S. PATENT DOCUMENTS

| | | | | | |
|---|---|---|---|---|---|
| 771,679 | A | * | 10/1904 | Stock | A47C 7/002 |
| | | | | | 16/42 R |
| 1,165,046 | A | * | 12/1915 | Von Der Lin et al. | ....................... |
| | | | | | A47B 91/024 |
| | | | | | 16/42 R |
| 1,367,922 | A | * | 2/1921 | Ramsey | A47B 91/04 |
| | | | | | 16/42 R |
| 1,400,781 | A | * | 12/1921 | Wagner, Jr. | A47B 91/04 |
| | | | | | 135/82 |

(Continued)

FOREIGN PATENT DOCUMENTS

WO WO-9717817 A1 * 5/1997 .............. F16F 7/00

*Primary Examiner* — Edgardo San Martin
(74) *Attorney, Agent, or Firm* — Del Vecchio and Stadler LLP (57) ABSTRACT

An energy dissipation device is provided for creating a torturous energy flow path between a piece of equipment and a shelf that supports the piece of equipment. The energy dissipation includes a cover plate from which extends an externally threaded extension, and includes a cone component. The cone component has a base wall from which extends a cone having a tip. Together the base wall and the surrounding sidewall define an energy dissipation component recess. An energy dissipation component made of an energy dissipation material is disposed in the energy dissipation component recess. In another preferred embodiment there is a multiple piece energy dissipation device that has a cone assembly. Double, triple layer, and spaced triple layer energy dissipation devices are provided in other embodiments. In another preferred embodiment there is an adjustable energy dissipation device and a single layer adjustable energy dissipation device.

6 Claims, 9 Drawing Sheets

(56) References Cited

U.S. PATENT DOCUMENTS

| | | | | |
|---|---|---|---|---|
| 2,612,335 | A * | 9/1952 | Saltzman | F16M 11/36 135/79 |
| 5,290,973 | A * | 3/1994 | Kwoh | F16F 9/006 181/199 |
| 5,680,673 | A * | 10/1997 | Beshore | A47B 91/06 16/42 R |
| 5,681,023 | A * | 10/1997 | Sheydayi | H04R 1/026 248/346.11 |
| 5,771,990 | A * | 6/1998 | Liang | F16F 7/00 181/208 |
| 5,929,395 | A * | 7/1999 | Bizlewicz | F16F 1/40 181/207 |
| 5,942,735 | A * | 8/1999 | Liang | F16F 3/0876 181/207 |
| 6,155,530 | A * | 12/2000 | Borgen | H04R 1/026 16/42 R |
| 6,283,437 | B1 * | 9/2001 | Kang | F16F 15/02 181/207 |
| 6,626,405 | B1 * | 9/2003 | Keast | A47B 91/06 16/42 R |
| 6,830,125 | B1 * | 12/2004 | Bizlewicz | F16F 15/021 181/207 |
| 7,048,247 | B2 * | 5/2006 | Tanishima | F16M 7/00 248/188.8 |
| 7,263,806 | B2 * | 9/2007 | Pellegrino | A47B 47/021 248/564 |
| 7,743,882 | B2 * | 6/2010 | Vu | F16F 15/08 181/207 |
| 7,770,693 | B2 * | 8/2010 | Uejima | F16F 1/3737 181/207 |
| 8,827,221 | B2 * | 9/2014 | Wagner | A47C 7/002 248/188.9 |
| 8,833,511 | B2 * | 9/2014 | Maruyama | F16F 1/128 181/207 |
| 9,187,997 | B2 * | 11/2015 | Cramer | E21B 47/011 |
| 9,920,811 | B1 * | 3/2018 | Morrison | F16F 15/08 |
| 9,976,690 | B2 * | 5/2018 | Cornelissen | A47J 43/07 |
| 2006/0054379 | A1 * | 3/2006 | Chang | F16F 15/021 181/207 |

* cited by examiner

ENERGY DISSIPATION DEVICES

CROSS REFERENCE TO RELATED APPLICATIONS

This application claims the benefit of Provisional U.S. Patent Application No. 62/273,520 filed on Dec. 31, 2015, and Provisional U.S. Patent Application No. 62/199,589 filed on Jul. 31, 2015, and Provisional U.S. Patent Application No. 62/160,921 filed on May 13, 2015 and the entire content and disclosure of each is hereby incorporated herein by reference.

BACKGROUND

Expensive audio equipment is for individuals that desire to hear the very best output from their audio systems. Sometimes these individuals will refer to their audio equipment as high performance equipment. In addition, the stores that sell such high end audio equipment charge a great deal of money for the equipment.

However, there is a problem with the devices that are used to support the high performance audio and electronic equipment. Typically the high end audio and electronic equipment is placed on some form of a stand, for example the shelf of an audio stand. The high end audio and electronic equipment will typically have a relatively small foot one in each corner of the component. This results in poor output from the high end audio and electronic equipment because the vibrational energy in the room is directly transferred to the unsupported component chassis (of the audio and electronic equipment) and it is free to respond to energy in the room. The shelf supporting the equipment sits on can also have a relatively high or low energy content and is typically unknown to the user of the component. Thus the component chassis or the supporting shelf can cause noise in the component and degrade the component performance.

Thus, there is a need for a device that can be used to reduce or substantially eliminate the problems associated with component chassis noise while minimizing the impact of the response of the supporting shelf.

SUMMARY

An energy dissipation device is provided that creates a torturous energy flow path between a piece of equipment and a shelf that supports the piece of equipment and makes direct contact with a large portion (area) of the bottom chassis of the component. This adds stiffness to the chassis and provides for the transfer of energy from the chassis of the component to the shelf below while at the same time providing energy dissipation between the component and the shelf. This includes a cover plate from which extends an externally threaded extension. The energy dissipation device also includes a cone component that has a surrounding sidewall with an internal thread. The cone component also has a base wall from which extends a cone having a tip.

Together the base wall and the surrounding sidewall define an en energy dissipation component recess. An energy dissipation component having a generally cylindrical shape and made of an energy dissipation material is disposed in the energy dissipation component recess. The energy dissipation devices are disposed on a shelf, for example an audio stand, and may be connected to the piece of audio equipment with fasteners or adhesives.

In another preferred embodiment there is a multiple piece energy dissipation device that creates a torturous energy flow path between a piece of equipment and a shelf that supports the piece of equipment. The multiple piece energy dissipation device has a cone assembly that is adjustable so that a user may adjust the height of the multiple piece energy dissipation device in order to level the piece of equipment supported on shelf.

In another preferred embodiment there is a double layer energy dissipation device that includes component and an energy dissipation component. A center support member is positioned between the component and the energy dissipation component. The component may provide for energy transfer or absorption and the energy dissipation component provides for energy absorption while the structure of the double layer energy dissipation device provides for enhanced energy dissipation. In other preferred embodiment there is a triple layer energy dissipation device having a riser component. In another embodiment there is a spaced triple layer energy dissipation device comprising.

In the energy dissipation devices described herein, the contact area at the chassis is relative large compared to size of cone. That is, the input side and path to output side is different in total area and greater than 1 to 1. This is different than a typical cone devise, because in a typical cone devise the top of the cone geometry is in contact with the chassis.

In the energy dissipation devices described herein the top of the cone has a relatively small area to the contact surface of the chassis component. The energy dissipation devices described herein that take full advantage of this area difference to stiffen the chassis and dissipate energy over the relative difference in geometric areas.

Although the energy dissipation devices described herein present cones having circular cross sections, in other preferred embodiments the cones are replaced with other all geometries, for example square, triangular, oval, or virtually any other shape required for a particular application.

In other preferred embodiments there are multiple piece energy dissipation devices, and double layer, triple layer and spaced triple layer energy dissipation devices.

It is pointed out that the energy dissipation devices described herein take advantage of the area difference and/or the use of this difference to dissipate energy.

In addition, the energy dissipation components may be made from solids, polymers, fillers, fluids, and all other suitable energy dissipation materials now known or developed in the future. In other preferred embodiments the energy dissipation components are made of energy transmitting materials such as metal or aluminum.

In another preferred embodiment the problem with energy dissipation when a shelf is supported between non-parallel surfaces with, for example four energy dissipation devices. The problem is that no surface is truly flat or planar. Thus, only three of the energy dissipation devices will effectively dissipate energy, while the fourth energy dissipation device is not very effective at dissipating energy. This is overcome with an adjustable energy dissipation device such that there are three energy dissipation devices and an adjustable energy dissipation device supporting the shelf and the adjustable energy dissipation device can be adjusted such that it too can dissipate energy.

DESCRIPTION

Figure 1:
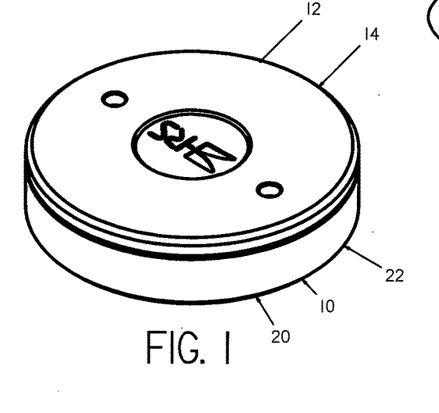
FIG. 1 is a perspective view of an energy dissipation device.
Figure 2:
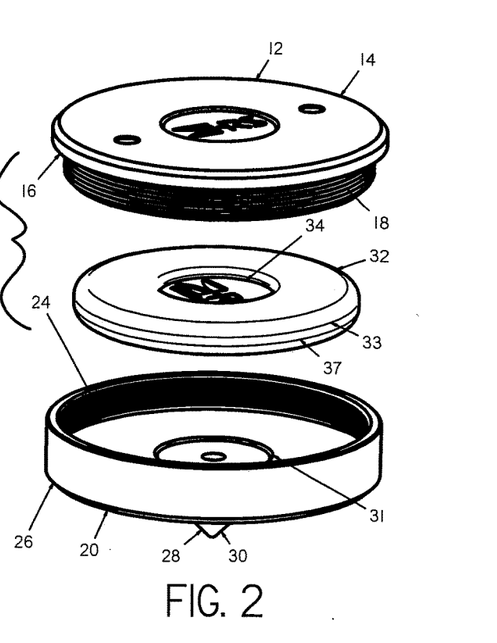
FIG. 2 is an exploded view of the energy dissipation device.
Figure 3:
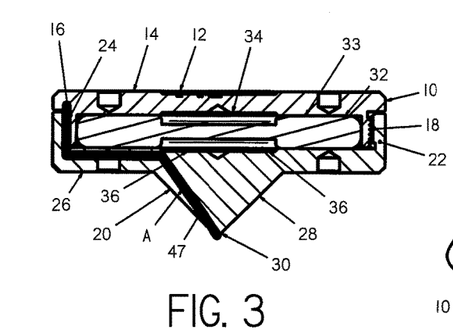
FIG. 3 is a sectional view of the energy dissipation device of FIG. 1.

As shown in FIGS. 1-3 there is an energy dissipation device 10. The energy dissipation device includes a cover plate 12 having opposed first and second sides 14, 16. The first side 12 is substantially flat, and the opposed second side 16 has extending from it an externally threaded extension 18. The cover plate 12 may be made of steel, plastic or other suitable material.

The energy dissipation device 10 also includes a cone component 20 that has a surrounding sidewall 22 with an internal thread 24. The cone component 20 also includes a base wall 26 from which extends a cone 28 having a tip 30. Together the base wall 26 and the surrounding sidewall 22 define an energy dissipation component recess 31, such that the cone component 20 is formed with the energy dissipation component recess 31.

The energy dissipation device 10 also includes an energy dissipation component 32 having a generally cylindrical shape 37, or disk-shape, and made of an energy dissipation material 33. For example, the energy dissipation material 33 may be an elastic or a visco-elastic material, solids, polymers, fillers, fluid filled containers, and all other suitable energy dissipation materials now known or developed in the future. The energy dissipation component 32 also has opposed first and second recesses 34, 36.

To assembly the energy dissipation device 10 the energy dissipation component 32 is moved into the energy dissipation component recess 31 that is defined in cone component 20. Next, the externally threaded extension 18 is threaded to the internal thread 24 of the cone component 20 such that the cover plate 12 and cone component 20 are held together.

Figure 4:
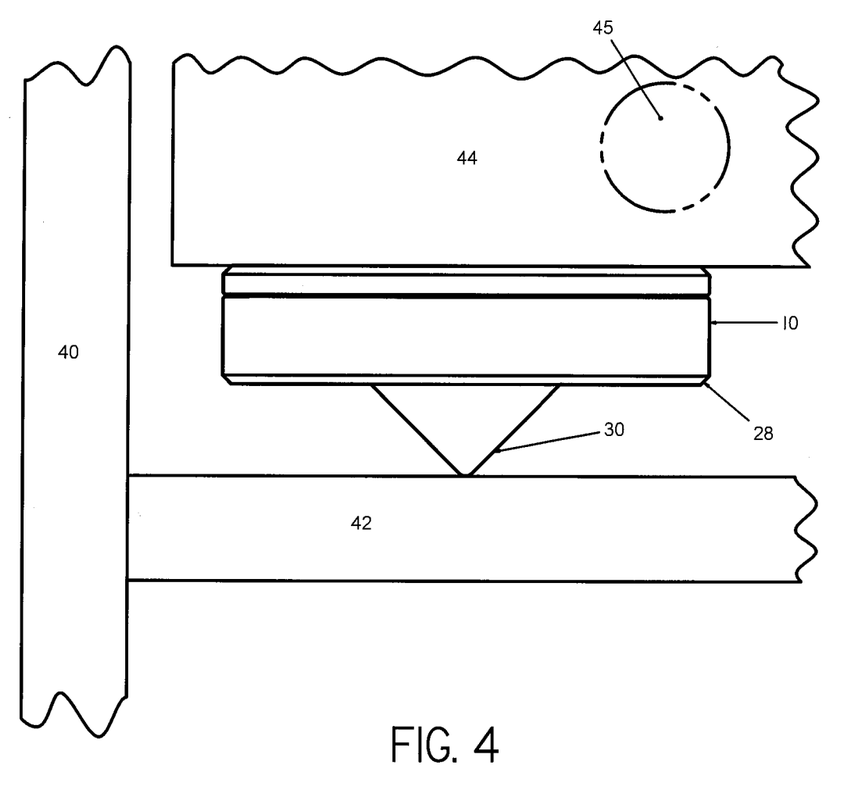
FIG. 4 is a front view of the energy dissipation device supported on a shelf and supporting a piece of audio or electronic equipment.
Figure 5:
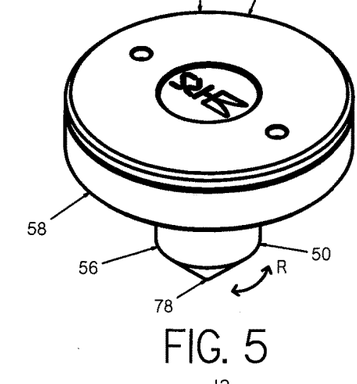
FIG. 5 is a perspective view of another embodiment depicting a multiple piece energy dissipation device.

As shown in FIG. 4, there is an audio stand 40 (shown in broken line) that has a shelf 42 (also shown in broken line) and the energy dissipation device 10 is supported on its tip 30 on a shelf 42 of an audio stand 40. A piece of audio or electronic equipment 44 is supported on the energy dissipation device 10, and the energy dissipation device 10 is supported on the on the shelf 42, it being understood that more than one energy dissipation devices 10 is used to support the piece of electronic equipment 44, For example, four energy dissipation devices 10 may be used to support the piece of electronic equipment 44 on the shelf 42. In addition, the piece of electronic equipment 44 may be any electronic equipment, for example a speaker 45.

As energy is produced by the piece of electronic equipment 44 the energy is forced to follow a torturous energy path 47 from the cover plate 12, through the surrounding sidewall 22 of the cone component 20, and then through the remainder of the cone component 20, and then to the tip 30 of the cone component 20. This tortuous energy path 47 is both long and complex and is designated by the arrows designated A in FIG. 3, and it serves to dissipate energy and reduce the amount of energy that reaches the tip 30, thus reducing vibration. At the same time, the energy dissipation component 32 functions to absorb energy from being outputted from the piece of electronic equipment 44, and the energy dissipation component 32 contacts both the cover plate 12 and the cone component 20.

Thus, the amount of energy reaching the shelf 40 is minimized, and as a result the degradation of the output from the electronic equipment 44 is a significantly reduced or virtually eliminated.

Figure 6:
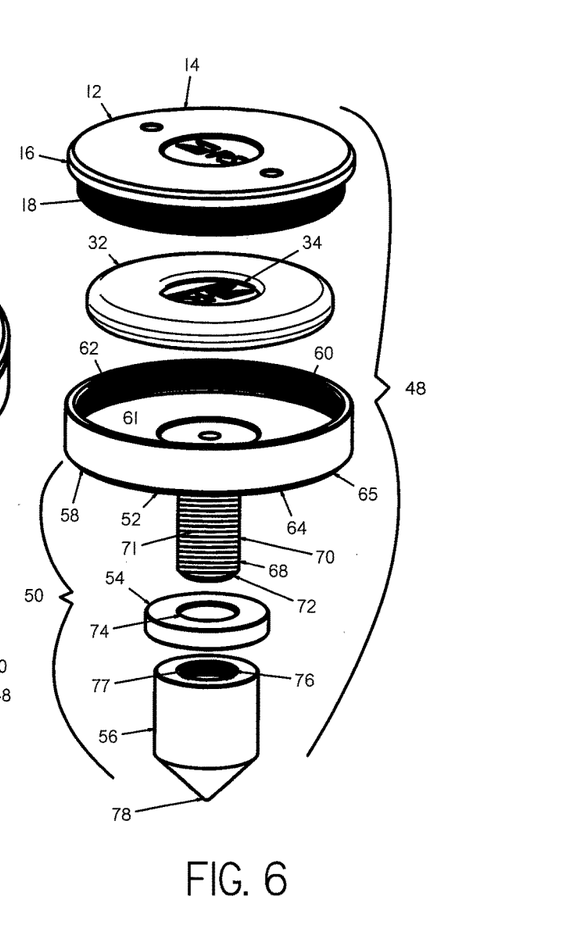
FIG. 6 is an exploded view of the multiple piece energy dissipation device.

FIGS. 5-9 show another preferred embodiment wherein there is a multiple piece energy dissipation device 48. As shown in FIG. 6, the multiple piece energy dissipation device 48 has the above-described cover plate 12 having opposed first and second sides 14, 16, wherein the opposed second side 16 has extending from it an externally threaded extension 18. It also has an energy dissipation component 32 that are the same as above-described energy dissipation component.

The multiple piece energy dissipation device 48 also includes a cone assembly 50. The cone assembly 50 has a cone support body 52, a cone ring 54, and a cone element 56.

As shown in FIG. 6, the cone support body 52 includes a surrounding sidewall 58 that has an internal thread 60. The surrounding sidewall 58 extends to a support body base 61 having opposed first and second base side 62, 64. The surrounding sidewall 58 and the support body base 61 together define an energy dissipation member recess 65. Extending from the second base side 64 of the support body base 61 is an extension member 68 having a cylindrical outer surface 70 that extends to an end wall 72. In one preferred embodiment the outer surface 70 has an external extension member thread 71.

The cone ring 54 defines a ring opening 74 that is sized to receive the extension member 68 therein. The cone ring 54 may be joined to the cone element 56 in one of the preferred embodiments or pressure fitted on the extension member 68.

The cone element 56 defines a cone recess 76 sized to receive the extension member 68 therein. In one of the preferred embodiments, there is an internal cone thread 77 that surrounds the cone recess 76. The cone element 56 also has a cone element tip 78.

To assemble the multiple piece energy dissipation device 48 the energy dissipation component 32 is moved into the energy dissipation member recess 65 and the cover plate 12 is threaded to the internal thread 60 of the cone element 56. Then, the extension member 68 is moved through the ring opening 74 defined in the cone ring 54. Then, the internal cone element thread 77 is threaded to the external extension member thread 71. After assembly, the user may adjust the cone element 56 relative to the cone support body 52 by simply rotating the cone element 56 (indicated by the arrow designated R in FIG. 5). This allows for leveling of the electronic equipment 44 supported on the multiple piece energy dissipation devices 48.

In another other preferred embodiments the internal thread 60 of the cone element 56 and the external extension member thread 71 are absent and the extension member 68 is moved into the cone recess 76 and held in place with a friction fit.

Figure 9:
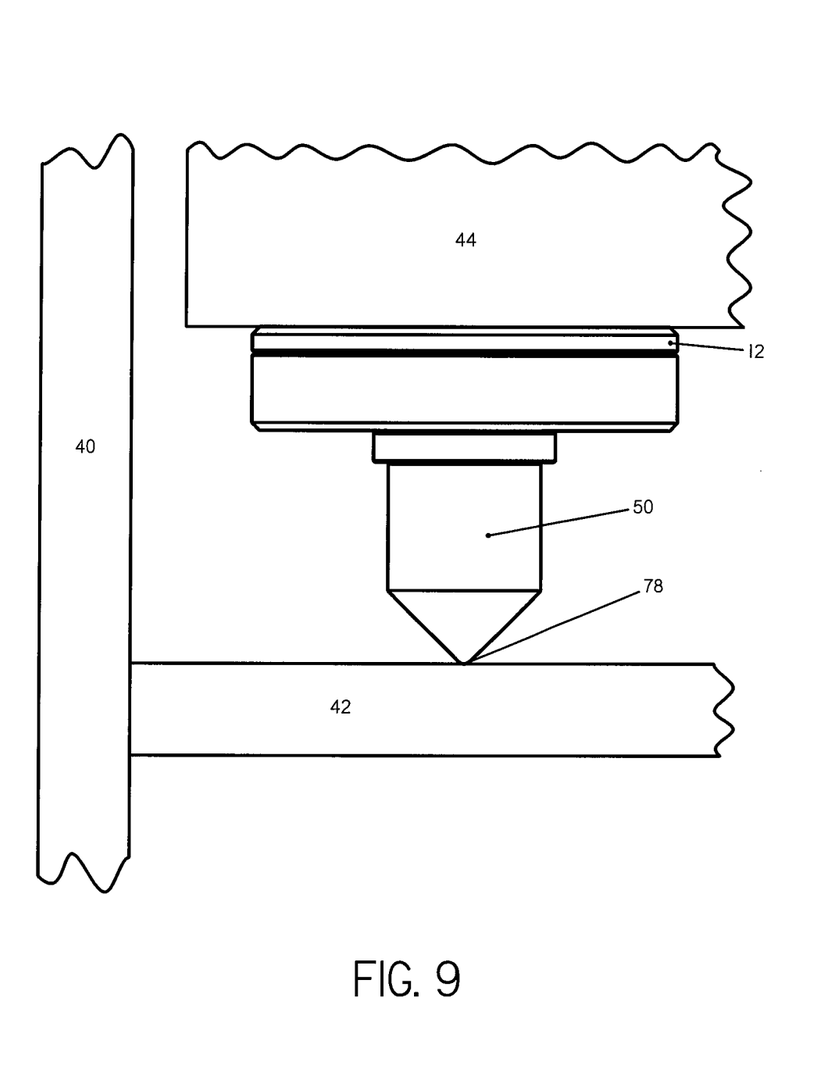
FIG. 9 is a front view of the multiple piece energy dissipation device supported on a shelf and supporting a piece of audio equipment or electronic equipment.

In addition, as shown in FIG. 9, the multiple piece energy dissipation device 48 is supported on its tip 78 on the shelf 42 of the audio stand 40. A piece of electronic equipment 44 is supported on the shelf 42. The electronic equipment 44 may be a speaker 45.

Figure 7:
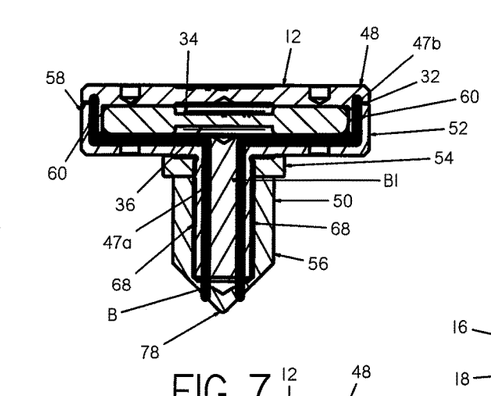
FIG. 7 is a sectional view of the multiple piece energy dissipation device when in it is not extended.

As energy is produced by the piece of electronic equipment 44 or otherwise transferred to the piece of electronic equipment 44 from external sources, the energy is forced to follow a torturous path from the cover plate 12, through the surrounding sidewall 58, through the extension member 68, through the cone ring 54 (in some instances such as shown in FIG. 7), through the external extension member thread 71, through the internal cone thread 77, through the cone element 56 and to the cone element tip 78. This energy path 47a is both long and tortuous and is designated by the arrows designated B in FIGS. 7 and 8, serves to dissipate energy and reduce the amount of energy that reaches the tip 78, thus reducing vibration. At the same time, the energy dissipation component 32 functions to absorb energy from being outputted from the piece of electronic equipment 44, because it is in contact with both the cover plate 12 and the cone element 56.

Figure 8:
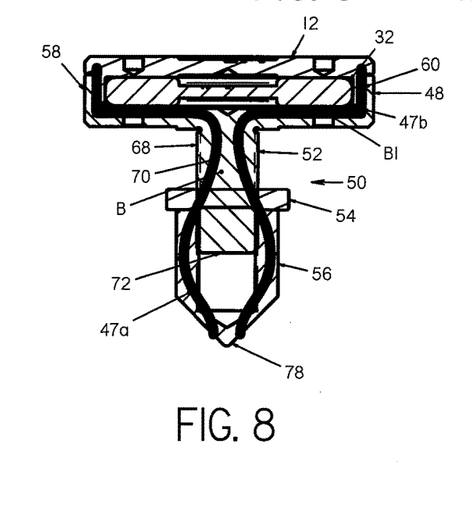
FIG. 8 is a section view of the multiple piece energy dissipation device when extended.

Thus, the amount of energy reaching the shelf 42 is minimized, and as a result the degradation of the output from the electronic equipment 44 is a significantly reduced or virtually eliminated. It is pointed out that if any remaining energy remains after flowing through the energy path 47a at the shelf 42, then it must flow in the reverse direction of the above-described energy path 47a along a reverse energy path 47b as indicated by B1. This provides for additional energy dissipation such that a reduced amount of energy is fed back to the piece of electronic equipment 44.

Figures 10, 11, 12:
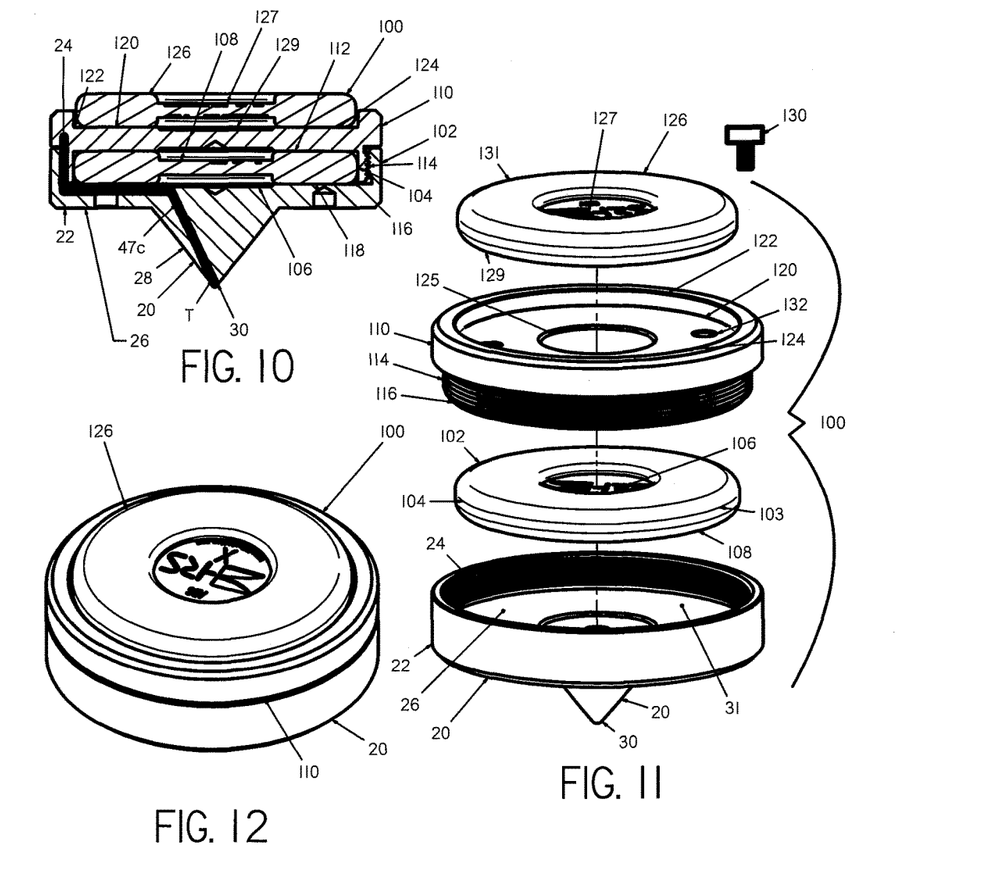
FIG. 10 is a sectional view of a double layer energy dissipation device.
FIG. 11 is an exploded view of the double layer energy dissipation device.
FIG. 12 is a perspective view of the assembled double layer energy dissipation device.

Another preferred embodiment is shown in FIG. 10-12. Turning now to FIG. 10, there is a sectional view of a double layer energy dissipation device 100. The double layer energy dissipation device 100 includes the previously described cone component 20 that has a surrounding sidewall 22 with an internal thread 24. The cone component 20 also includes a base wall 26 from which extends a cone 28 having a tip 30.

The double layer energy dissipation device 100 also includes an energy dissipation component 102 that is fitted in the energy dissipation component recess 31. The energy dissipation component 102 is identical to the previously described energy dissipation component 32 in one of the preferred embodiments. The energy dissipation component 102 has a generally cylindrical shape 103, or disk-shape, and is made of an energy dissipation material 104 or an energy transfer material. For example, the material 104 may be an elastic or a visco-elastic material, solids, polymers, fillers, fluids, and all other suitable energy dissipation materials now known or developed in the future or may be made of an energy transfer material such as metal. The first energy dissipation component 102 also defines opposed component recesses 106, 108.

The double layer energy dissipation device 100 also includes a center support member 110. The center support member 110 has a first support member side 112 (FIG. 10) and an externally threaded surrounding wall 114 extends from the first support member side 112, and the externally threaded surrounding wall 114 defines a first center support member recess 116. The externally threaded surrounding wall 114 is capable of being threaded to the internal thread 24 of the surrounding sidewall 22 of the cone component 20. A first energy dissipation component recess 118 is defined by the base wall 26 of the cone component 20, the externally threaded surrounding wall 114, and the first support member side 112 when the center support member 110 is treaded to the cone component 20. The first energy dissipation component 102 is disposed in the first energy dissipation component recess 118.

The center support member 110 has a second support member side 120 that faces in the opposite direction as the first support member side 112. Extending from the second support member side 120 is a surrounding retaining wall 122, and together the second support member side 120 and the surrounding retaining wall 122 define a component recess 124. As shown in FIG. 11, the center support member 110 also defines a center support member opening 125.

A component 126 is disposed in the component recess 124. In one of the preferred embodiments the component is 126 is made of metal, but in other preferred embodiments the component 126 may be structurally identical to the first energy dissipation component 102, and has opposed component recesses 127, 129. The component 126 is, in one of the preferred embodiments, held to the center support member 110 with an adhesive 111, and in other preferred embodiments it is held in place with fasteners 130 that extend trough second energy dissipation component openings 131 and threaded to internally threaded center member recesses 132 as shown in FIG. 11. FIG. 12 shows the assembled double layer energy dissipation device 100.

The double layer energy dissipation device 100 provides for enhanced energy dissipation. In particular, as energy is produced by the piece of electronic equipment 44 the energy is forced to follow an energy path 47c that is both long and torturous and is indicated by arrow T in FIG. 10 beginning at the component 126, through the center support member 110, through the surrounding sidewall 22 and internal thread 24 of the cone component 20, and then through the cone 28 to the tip 30 of the cone 28. This long energy path serves to dissipate energy and reduces the amount of energy that reaches the tip 30 of the cone component 20, thus reducing vibration. At the same time, the energy dissipation component 102 functions to absorb energy being outputted from the piece of electronic equipment 44, because the energy dissipation component 102 is in contact with both the center support member 110 and the cone component 20. The component 126 is in contact with both the center support member 110 and the piece of electronic equipment 44 supported thereon and if made of metal can function to transfer energy.

Figure 13:
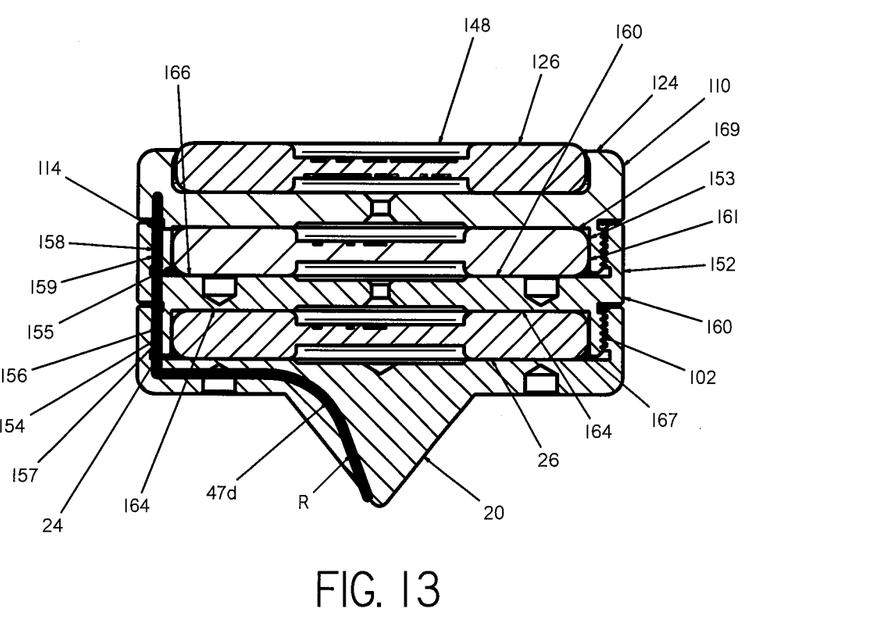
FIG. 13 is a sectional view of another preferred embodiment wherein there is a triple layer energy dissipation device.

FIG. 13 is a sectional view of another preferred embodiment wherein the there is a there is triple layered energy dissipation device 148. Here a riser component 152 is installed between the center support member 110 and the cone component 20.

As shown the triple layered energy dissipation device 148 has the previously described cone component 20 that has the surrounding sidewall 22 with the internal thread 24. The cone component 20 also includes the base wall 26 from which extends the cone 28 having a tip 30. Together the base wall 26 and the surrounding sidewall 22 define an energy dissipation component recess 31. The triple layered energy dissipation device 148 also has the previously described center support member 110 and the energy dissipation component 102 and component 126. Thus, these are not described herein again.

As shown, the triple layered energy dissipation device 148 has a riser component 152 and a riser energy dissipation component 153. The riser component 152 has a first riser surrounding wall 156 having a first riser wall external thread 157 and a second riser surrounding wall 158 having a second riser wall internal thread 159, and the first and second riser surrounding walls 156, 158 extend in opposite directions from a riser component base 160. The riser component base 160 has and opposed first and second riser component sides 164, 166 from which the first and second riser surrounding walls 156, 158, respectively, extend.

The first riser surrounding wall 156, the first riser component side 164 and the base wall 26 define a first component recess 167. The energy dissipation component 102 is disposed in the first component recess 167 and the first riser wall external thread 157 is threaded to the internal thread 24 of the cone component 20 as shown.

The riser energy dissipation component 153 is supported on the second side 166 of the riser component 152, and the externally threaded surrounding wall 114 of the center support member 110 is threaded to the second riser wall internal thread 159. It is pointed out that the second side 166 of the riser component and the externally threaded surrounding wall 114 of the center support member 110, and the first support member side 112 define a riser energy dissipation component recess 169 and the riser energy dissipation component 153 is disposed therein. The component 126 is supported on the center support member 110 in the previously described component recess 124.

The triple layered energy dissipation device 148 provides for an energy path 47d that is both long and torturous and is indicated by the arrow designated R. The energy path 47d begins at the component 126, through the center support member 110, through the second riser wall internal thread 159 and riser component 152, through the surrounding sidewall 22 and internal thread 24 of the cone component 20, and then through the cone 28 to the tip 30 of the cone 28. This long energy path 47d serves to transfer energy and dissipate energy and reduces the amount of energy that reaches the tip 30 of the cone component 20, thus reducing vibration. At the same time, the component 126 may serve to transfer or absorb energy and the energy dissipation component 102 and the riser energy dissipation component 153 function to absorb energy being outputted from the piece of electronic equipment 44.

It is to be understood that one or more layers and two or more layers energy dissipation devices can be constructed. Thus, in other preferred embodiments additional riser components 152 and energy dissipation components can be stacked in a like manner such that quadruple and more than quadruple layer energy dissipation devices can be constructed, and additional layers can be added on top of that without limitation. In other words, there is no limitation on the number of layers of additional riser components 152 and energy dissipation components that can be stacked in other preferred embodiments of the energy dissipation devices. All of these embodiments are within the scope of the present invention.

It is pointed out that as shown in FIG. 13, the center support member 110 is in full contact with the riser component 152 and both may be made of metal, and they are in full contact with one another and allow energy to transfer between them. In other preferred embodiments there is no metal-to-metal contact, that is, the support member 110 makes no contact with the riser component 152 and energy is transferred the through the energy absorption layer or energy dissipation components. In yet other preferred embodiments the amount of metal-to-metal contact is limited and controlled, such that there is some metal-to-metal contact, but not full or complete metal-to-metal contact. Controlling the amount or degree of metal-to-metal contact provides for control of or the limiting of the amount of energy transfer between the center support member 110 and the riser component 152. Thus, the amount of metal-to-metal contact can range from complete or full metal-to-metal contact, to limited metal-to-metal contact, to no metal-to-metal contact in any of the embodiments described herein to allow for performance adjustments.

It is pointed out that with respect to the double and triple layer energy dissipation devices 100, 148 and the embodiments thereof, the energy dissipation component 102 may be made of metal or energy dissipation material and the component 126 may be made of metal or energy dissipation materials, and the riser energy dissipation component 153 can be made of elastic or a visco-elastic material, solids, polymers, fillers, fluids, and combinations thereof, and metals in one of the preferred embodiments. The energy dissipation materials include all suitable energy dissipation materials now known or developed in the future, and may all be the same or different, or some may be the same with others different without limitation. Use of such materials allows for performance adjustments. In addition, the cone component 20, the center support member 110 and the riser component 152 may be made of metals, alloys, plastics, wood, polymer(s) and combinations thereof, and other suitable materials without limitation. Use of such materials allows for performance adjustments. Also, the cone component 20, the center support member 110 and the rise component 152 may be made of the same material or different materials, or some may be made of the same material and others may be made of different materials without limitation to further allow for performance adjustments.

Likewise, with respect to the first and second embodiments, the cover plate 12 and cone component 20 of the energy dissipation device 10, and the cover plate 12 and the elements of the cone assembly 50 of the multiple piece energy dissipation device 48 may be made of metals, alloys, plastics, wood, polymer(s) and combinations thereof, and other suitable materials without limitation and may be made of the same materials of different materials. Use of such materials allows for performance adjustments.

It is pointed out that the energy dissipation device 10, the multiple piece dissipation device 48, and the double layer energy dissipation device 100 and triple layered energy dissipation device 148 may be connected, for example they may be glued or screwed to the piece of equipment 44 to support same, or the piece of equipment 44 may be simply supported on these devices.

Although the energy dissipation device 10, the multiple piece energy dissipation device 48, and the double layer energy dissipation device 100 and triple layered energy dissipation device 148 described herein present and make use of cones and cone components having circular cross sections, in other preferred embodiments the cones are replaced with other any suitable geometry, for example square, triangular, oval, or virtually any other shape or geometry required for a particular application without limitation.

FIGS. 14-17 show another preferred embodiment wherein there is an adjustable energy dissipation device 200 that is similar to the embodiment show in FIGS. 10-12. In particular, as shown in the drawings the adjustable energy dissipation device 200 has all the elements previously described in connection with FIGS. 10-12, but has an adjustable cone component 202 that is different than the previously described cone component 20. It is pointed out the all the previously described components in FIGS. 10-12 are shown in FIGS. 14-17 but are not hereagain described for the sake of convenience and clarity.

Figures 14, 15, 16, 17, 18:
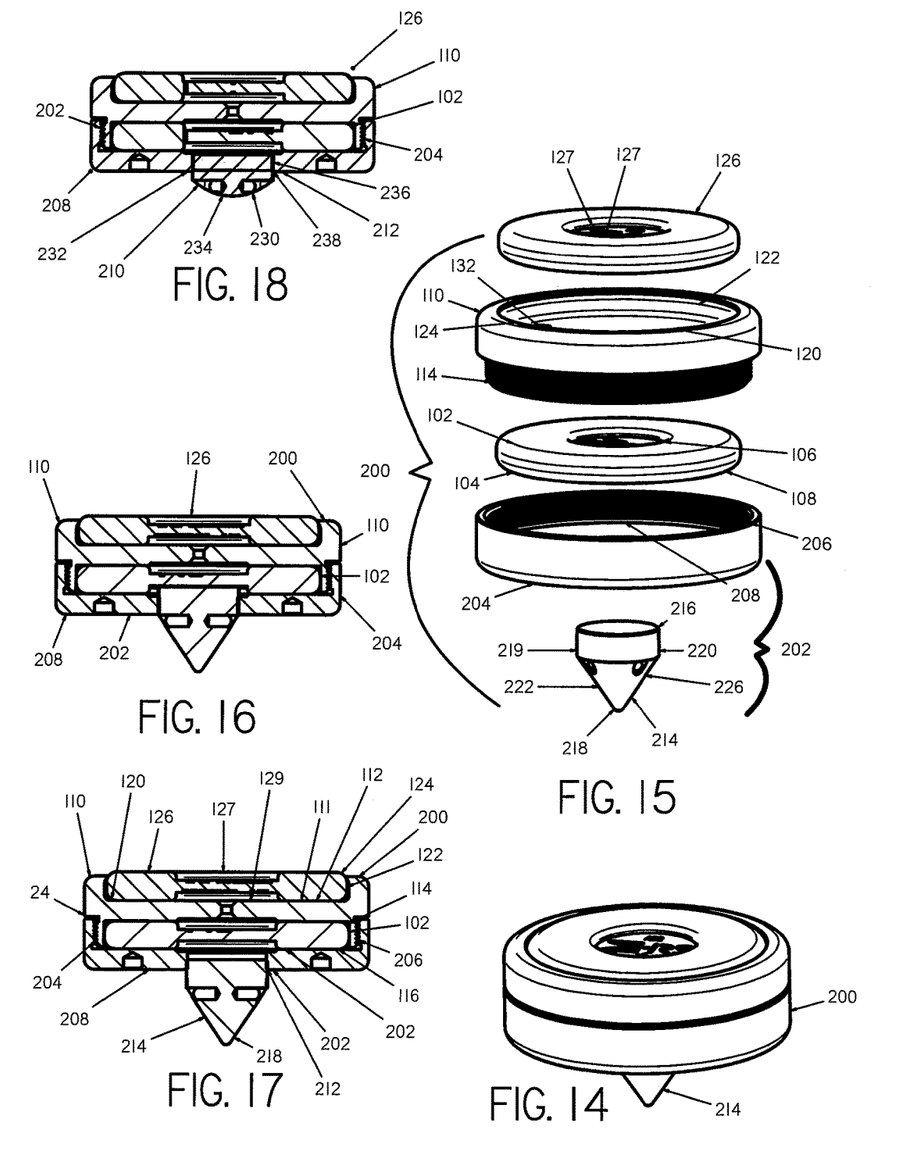
FIG. 14 is a perspective view of another preferred embodiment showing an adjustable energy dissipation device.
FIG. 15 is an exploded view of an adjustable energy dissipation device.
FIG. 16 is a sectional view of the adjustable energy dissipation device having an adjustable cone and wherein the adjustable cone is retracted.
FIG. 17 is a sectional view of the adjustable energy dissipation device wherein the adjustable cone is extended.
FIG. 18 is a front view of another embodiment of adjustable energy dissipation device having an adjustable convex element.

As shown in FIGS. 14-17, the adjustable energy dissipation device 200 has an adjustable component 202. As shown in FIG. 17, the adjustable component 202 has a surrounding sidewall 204 with an internal thread 206 and has a base wall 208. The base wall 208 defines a base wall opening 210 having an internal base wall thread 212.

The adjustable component 202 also includes an adjustable cone 214 having a flat end 216 and an opposed cone tip 218. The adjustable cone 214 also has a cylindrical portion 219 that has an external thread 220. The cylindrical portion 219 meets with a tapered portion 222 and the tapered portion 222 extends to the cone tip 218. Cone adjustment openings 226 are defined in the adjustable cone 214 such that a shaft 228 (FIG. 16) can be inserted therein to rotate the adjustable cone 214. The external thread 220 is threaded to the internal base wall thread 212, such that upon rotation of the adjustable cone 214 the cone tip 218 can be moved toward or away from the base wall 208 to adjust the height of, for example, audio equipment 44 supported on the adjustable energy dissipation device 200. Thus, the adjustable cone 214 serves as a control element.

In another preferred embodiment shown in FIG. 18, the adjustable cone 214 is replaced with an adjustable convex element 230. The adjustable convex element 230 has a cylindrical portion 232 that extends to a convex portion 234 and the cylindrical portion 232 has an external cylindrical portion thread 236. Convex element openings 238 are defined in the adjustable convex element 230 such that the shaft 228 can be inserted therein to rotate the adjustable convex element 230. The external cylindrical portion thread 234 is threaded to the internal base wall thread 212 such that upon rotation of the adjustable convex element 230 the convex portion 234 can be moved toward or away from the base wall 208 to adjust the height of, for example, audio equipment 44 supported on the adjustable energy dissipation device 200. Thus, the adjustable convex element 230 serves as a control element.

It is pointed out that the adjustable component 202 can be used in connection with the other embodiments described above.

For example, take a shelf 42 or piece a piece of equipment 44 that is supported on four double layer energy dissipation devices 100 that, in turn, are supported on another shelf or the floor. In this example there are really on three of the energy dissipation devices 100 that make intimate contact with the shelf 40 or the floor, because no surface is truly flat. Thus, in this example only three of the double layer energy dissipation devices 100 are available for energy dissipation. When at least one of the double layer energy dissipation devices 100 is replaced with the adjustable energy dissipation device 100 the adjustable energy dissipation device 200 can be adjusted to such that it too is available to dissipate energy. Thus, not only do the three double layer energy dissipation devices 200 dissipate energy, but also the adjustable energy dissipation device 200 can be adjusted into contact with the shelf 40 such that it too dissipates energy and thus provides for improved energy dissipation.

Normally, when there are two surfaces that are not parallel and four (4) energy dissipation devices are disposed between the two surfaces that are not parallel, for example the energy dissipation devices 10 shown in FIG. 1, there is only contact pressure on three of the energy dissipation devices 10 making integral contact with the parallel surfaces. The non-parallel surfaces may be, for example the bottom of a piece of equipment and the floor or the bottom of a piece of equipment and a shelf that supports the piece of equipment wherein the energy dissipation devices 10 are disposed therebetween. There is not equal contact pressure on each of the four energy dissipation devices 10 because one of them is not making integral contact with both of the non-parallel surfaces. The above-described adjustable energy dissipation device 200 overcomes this problem because it can be adjusted into contact with the non-parallel surfaces such that not only do the three energy dissipation devices make integral contact with the non-parallel surfaces, but the adjustable energy dissipation device 200 also makes integral contact with the non-parallel surfaces, such that together all four dissipate energy. Thus, equal contact pressure is achievable between two surfaces that are not parallel. Furthermore, additional adjustable energy dissipation devices 200 can be provided to make integral contact at not only at four locations, but more than four locations, for example five, six, seven or more locations without limitation.

Figure 19:
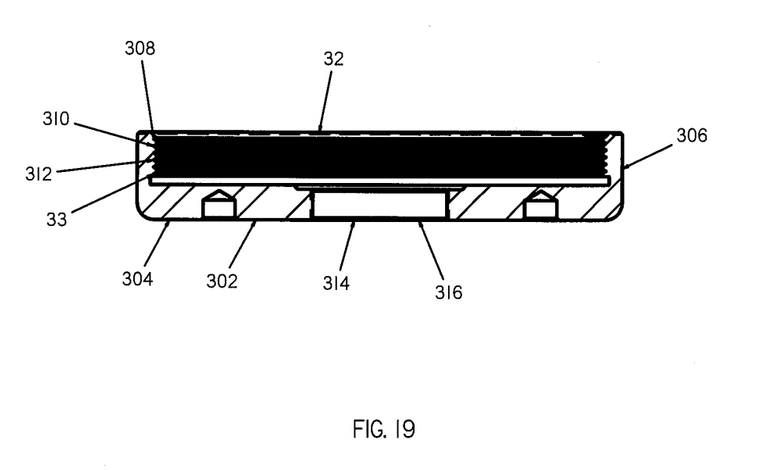
FIG. 19 is a sectional view of another embodiment of an adjustable energy dissipation device wherein the cover plate is absent.

FIG. 19 shows another preferred embodiment of a single layer adjustable energy dissipation device 300 that has a support base 302 having a base portion 304 from which extends a surrounding sidewall 306. The surrounding sidewall 306 has cylindrical shape. The surround sidewall 306 and the support base 302 define an energy dissipation component recess 308. An energy dissipation component 32 having a generally cylindrical shape, or disk-shape, and made of an energy dissipation material is positioned in the energy dissipation component recess 308. The energy dissipation component 32 is held in the energy dissipation component recess 308 with adhesives 310 or a friction fit. In another preferred embodiment the surrounding sidewall 306 may be made with an internal thread 312 and the energy dissipation component 32 may be made to have an external thread 33 so that the energy dissipation component 32 can be screwed into the energy dissipation component recess 308.

The base portion 304 defines a base opening 314 that is surrounded by an internal base thread 316. The previously described adjustable cone 214 or adjustable convex element 230 is threaded to internal base thread 316.

Figure 20:
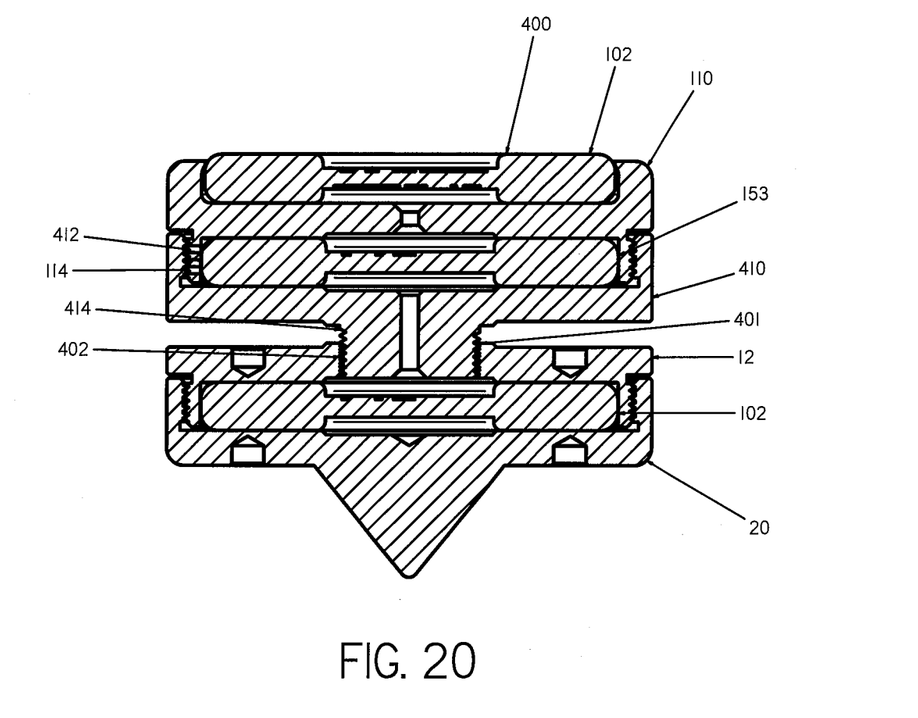
FIG. 20 is a sectional view of a spaced triple layer energy dissipation device

In another preferred embodiment shown in FIG. 20 there is a spaced triple layer energy dissipation device 400 having a cone component cone component 20, the center support member 110, and cover plate 12 wherein the cover plate 12 has an opening 401 surrounded by an internal thread 402. The there is a spacer component 410 having an internally threaded portion 412 that threads to internally threaded surrounding wall 114 of the center support member 110. The spacer component 410 also has an externally threaded portion 414 threaded to the internal thread 402 of the cover plate 12. The energy dissipation component 102, the riser energy dissipation component 153, and the component 126 are disposed in the same manner as described in connection with the triple layered energy dissipation device 148. Thus, the spacer component 410 is spaced from the cover 12 and provides for an energy path.

It is pointed out that in the above-described embodiments the cover plate 12 may be absent or present. It is further pointed out that in other preferred embodiments the above-described external threads and internal threads that are used for securing purposes can be removed and the components are pressure fitted together.

It will be appreciated by those skilled in the art that while an energy dissipation device 10, the multiple piece energy dissipation device 48, and double layer energy dissipation device 100, the triple layered energy dissipation device 148, the adjustable energy dissipation device 200, and the single layer adjustable energy dissipation device 300 have been described in connection with particular embodiments and examples, the energy dissipation device 10, the multiple piece energy dissipation device 48, and the double layer energy dissipation device 100, triple layered energy dissipation device 148, the adjustable energy dissipation device 200 and the single layer adjustable energy dissipation device 300 are not necessarily so limited and that other examples, uses, modifications, and departures from the embodiments, examples, and uses may be made without departing from the energy dissipation device 10, the multiple piece energy dissipation device 48, and the double layer energy dissipation device 100, triple layered energy dissipation device 148, the adjustable energy dissipation device 200 and the single layer adjustable energy dissipation device 300. All these embodiments are intended to be within the scope and spirit of the appended claims.

What is claimed:

1. A double layer energy dissipation device comprising:
   a cone component having a surrounding sidewall with an internal thread, a base wall from which extends a cone having a tip, and wherein the base wall and the surrounding sidewall define an energy dissipation component recess;
   an energy dissipation component;
   a center support member having a first support member side and an externally threaded surrounding wall extends from the first support member side, and the externally threaded surrounding wall defines a first center support member recess;
   the externally threaded surrounding wall is threaded to the internal thread of the surrounding sidewall of the cone component and an energy dissipation component recess is defined by the base wall of the cone component, the externally threaded surrounding wall, and the first support member side when the center support member is treaded to the cone component, and the energy dissipation component is disposed in the dissipation component recess;
   the center support member has a second support member side that faces in the opposite direction as the first support member side and a surrounding retaining wall extends from the second support member side and together the second support member side and the surrounding retaining wall define a component recess; and,
   a component is disposed in the component recess.

2. The double layer energy dissipation device according to claim 1 wherein energy transmitted to the component follows a torturous energy path that flows through the component, through the center support member, through the surrounding sidewall and internal thread of the cone component, and then through the cone to the tip of the cone along a energy path that is torturous and serves to dissipate energy and reduces the amount of energy that reaches the tip of the cone component to reduce vibration and at the same time the first energy dissipation component and the second energy dissipation component absorb energy being outputted from the piece of electronic equipment.

3. The double layer energy dissipation device according to claim 1 wherein the base wall defines a base wall opening having an internal thread and the cone has an external thread that is threaded to the internal thread such that cone is secured to the base wall and the cone is adjustable relative to the base wall.

4. The double layer energy dissipation device according to claim 3 wherein cone is replaced with an adjustable convex element having an external cylindrical portion thread that is threaded to the internal thread such that the adjustable cone is secured to the base wall and adjustable relative to the base wall.

5. An adjustable energy dissipation device comprising:
   a support base having a base portion from which extends a surrounding sidewall and the surrounding sidewall having an internal thread and the support base define an energy dissipation component recess;
   an energy dissipation component having an external thread threaded to the internal thread such that the energy dissipation devices is disposed in the surrounding sidewall; and,
   wherein the base portion defines a base opening that is surrounded by an internal base thread and adjustable cone having an external thread is threaded to the internal base thread such that the adjustable cone can be adjusted relative to the base portion.

6. The adjustable energy dissipation device according to claim 5 wherein the adjustable cone is replaced with an adjustable convex element having an external cylindrical portion thread that is threaded to the internal base thread such that the adjustable convex element can be adjusted relative to the base portion.

* * * * *